(12) United States Patent
Abzarian et al.

(10) Patent No.: US 8,091,115 B2
(45) Date of Patent: Jan. 3, 2012

(54) DEVICE-SIDE INLINE PATTERN MATCHING AND POLICY ENFORCEMENT

(75) Inventors: David Abzarian, Kirkland, WA (US); Todd L. Carpenter, Monroe, WA (US); Harish S. Kulkarni, Redmond, WA (US); Mark A. Myers, Fall City, WA (US); David J. Steeves, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 12/245,060

(22) Filed: Oct. 3, 2008

(65) Prior Publication Data

US 2010/0088759 A1    Apr. 8, 2010

(51) Int. Cl.
*H04L 29/06* (2006.01)
(52) U.S. Cl. ............................................ 726/1
(58) Field of Classification Search .................. None
See application file for complete search history.

(56) References Cited

U.S. PATENT DOCUMENTS

| | | | |
|---|---|---|---|
| 6,892,241 | B2 | 5/2005 | Kouznetsov et al. |
| 7,216,366 | B1 | 5/2007 | Raz et al. |
| 7,260,847 | B2 | 8/2007 | Sobel et al. |
| 7,370,346 | B2 | 5/2008 | Congdon |
| 7,620,988 | B1 * | 11/2009 | Hernacki ........................ 726/23 |
| 2005/0138418 | A1 | 6/2005 | Spry et al. |
| 2006/0021032 | A1 | 1/2006 | Challener et al. |

FOREIGN PATENT DOCUMENTS

WO    2004075509 A1    9/2004

OTHER PUBLICATIONS

Joel Snyder, "Antivirus trends and strategies", http://searchsecuritychannel.techtarget.com/tip/0,289483,sid97_gci1247943,00.html.
"SecurityPlus for MDaemon". http://www.sharewareconnection.com/securityplus-for-mdaemon.htm, Jan. 15, 2008.
Bender, et al., "Accountability as a Service", Proceedings of the 3rd USENIX workshop on Steps to reducing unwanted traffic on the Internet, Santa Clara, CA, Article No. 5, 2007, pp. 1-11.

* cited by examiner

*Primary Examiner* — Brandon Hoffman

(57) ABSTRACT

Inline pattern matching and policy enforcement may be implemented by a memory storage device. In an example embodiment, a device-implemented method includes acts of receiving, intercepting, and performing and conditional acts of invoking or permitting. A request from a host to perform a memory access operation is received at a memory storage device. Data flowing between an I/O channel and physical storage of the memory storage device is intercepted. A pattern matching procedure is performed on the data with reference to multiple target patterns in real-time while the data is being intercepted. If a pattern match is detected between the data and a target pattern, a policy enforcement mechanism is invoked. If a pattern match is not detected between the data and the multiple target patterns, the request from the host to perform the memory access operation is permitted.

20 Claims, 9 Drawing Sheets

DEVICE-SIDE INLINE PATTERN MATCHING AND POLICY ENFORCEMENT

BACKGROUND

Computers and other electronic machines have become increasingly interconnected. At the same time, they have become more complicated in terms of hardware, software, and functionality. The greater level of complication enables complex attacks to be perpetrated on them. The increased interconnection enables attacks to be spread between and among different machines at a very fast pace.

These factors have created an environment in which electronic machines are constantly exposed to maleficent exploits. Such exploits can cause great harm. For example, exploits can cause the loss of data and malfunctions that consume time and other resources. Exploits can also result in the theft of information, including valuable private and confidential data. To combat these attacks, an industry has arisen that attempts to thwart the perpetration of maleficent exploits. Unfortunately, current industry efforts fail to prevent all malware from causing harm.

SUMMARY

Inline pattern matching and policy enforcement may be implemented by a memory storage device. In an example embodiment, a device-implemented method includes acts of receiving, intercepting, and performing and conditional acts of invoking or permitting. A request from a host to perform a memory access operation is received at a memory storage device. Data flowing between an input/output (I/O) channel and physical storage of the memory storage device is intercepted. A pattern matching procedure is performed on the data with reference to multiple target patterns in real-time while the data is being intercepted. If a pattern match is detected between the data and a target pattern, a policy enforcement mechanism is invoked. If a pattern match is not detected between the data and the multiple target patterns, the request from the host to perform the memory access operation with the physical storage of the memory storage device is permitted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

DETAILED DESCRIPTION

Figure 1:
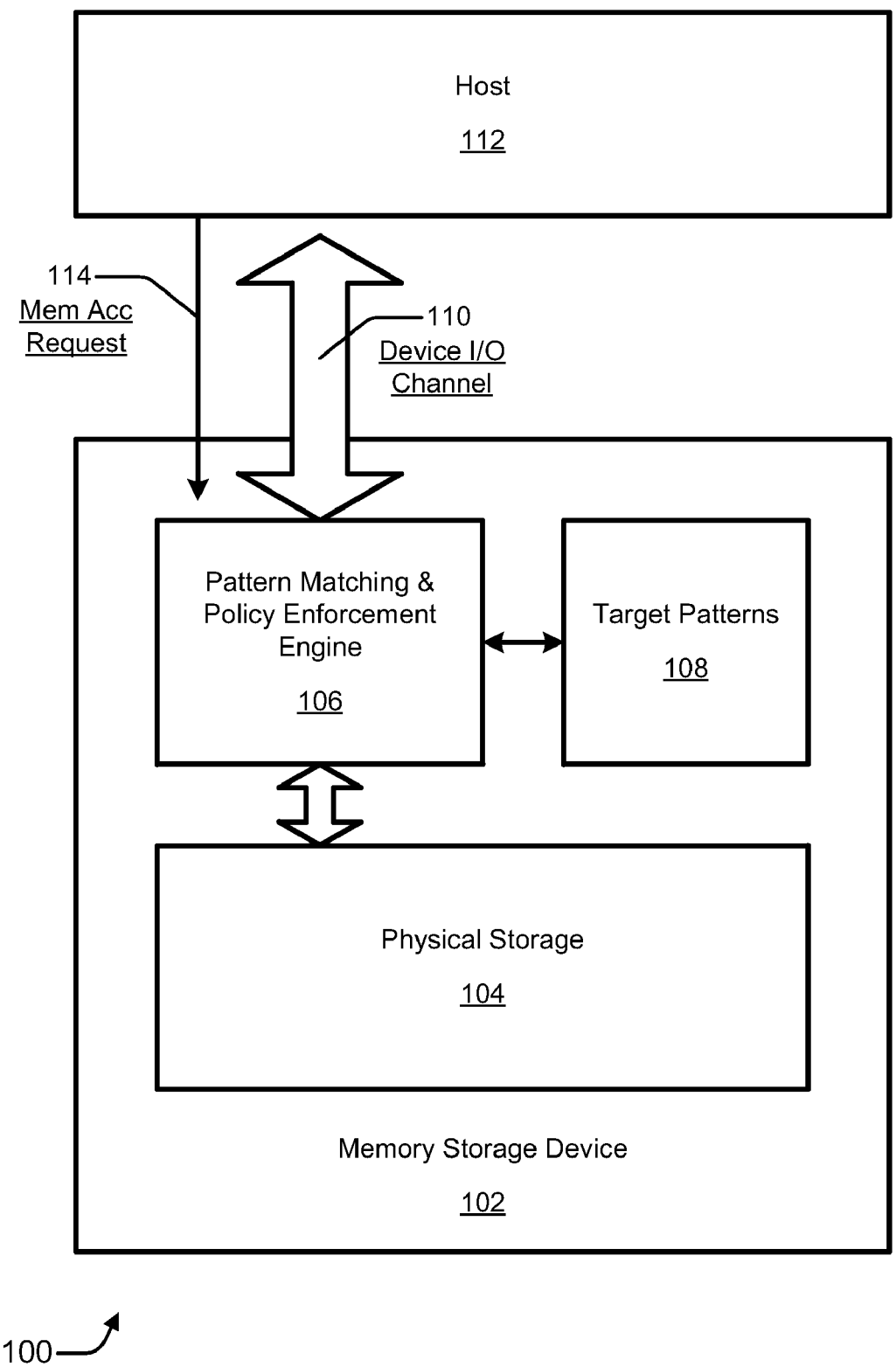
FIG. 1 is a block diagram illustrating an example memory storage device that is capable of device-side inline pattern matching and policy enforcement.

As explained herein above, current industry practices fail to prevent all malware from causing harm. Typically, anti-malware efforts are conducted on a host (e.g., a client, a server, an entertainment or other) machine using software. When files are scanned on the host, the file may already be in a position to cause harm. Moreover, scanning for malware can consume significant computational resources of the host, which negatively impacts the ability of the host to perform other tasks.

More specifically, both enterprises and consumers face a broad problem with respect to protecting data on transient storage devices, such as Universal Serial Bus (USB) flash drives, from virus and other malware infection. Furthermore, it is difficult to protect the enterprise from the ingress of viruses and other malware that is present on these types of memory storage devices. Because these devices are transient in nature, it is unwise to assume that the host interfacing with the device will necessarily provide any particular level of protection from the ingress or egress of malicious software or infected data.

Software vendors do offer a multitude of software based anti-virus solutions. However, these solutions typically install a driver into the host operating system. These drivers are intended to monitor file system operations and intercept malicious code during file reads or writes. Such approaches fail to adequately protect against malware present on transient memory storage devices and can consume significant host processing resources.

In contrast, for an example embodiment that is described herein, malware scanning is performed by a memory storage device. More generally, pattern matching and policy enforcement may be performed by a pattern matching and policy enforcement engine that is disposed on a memory storage device. A pattern matching and policy enforcement operation may be performed with reference to multiple target patterns. If a match is detected between a target pattern and data, policy enforcement is invoked. For example, a data access operation may be rejected or terminated.

In certain example embodiments, the pattern matching and policy enforcement may be performed inline and in real-time during a data transfer. Because the pattern matching and policy enforcement is performed onboard the memory storage device, a user may travel with the memory storage device to any host, regardless of operating system or host implementation (at least in certain embodiments). This device-side approach can provide protection to both the host and the inherently stored data.

By way of relatively specific example, a transient memory storage device that is capable of inline pattern matching and policy enforcement is described herein. The transient memory storage device includes physical storage, multiple target patterns, an input/output (I/O) channel, and a pattern matching and policy enforcement engine. The physical storage includes solid-state memory that is capable of storing data. The multiple target patterns include malware signatures. The pattern matching and policy enforcement engine is positioned so as to intercept data flowing between the I/O channel and the physical storage. The pattern matching and policy enforcement engine includes a pattern matching component and a policy enforcement component.

In operation, the I/O channel receives a request from a host to perform a memory access operation with the physical storage. The pattern matching component performs a pattern matching procedure on the data with reference to the multiple target patterns in real-time while the data is being intercepted. The policy enforcement component performs a policy enforcement procedure. The policy enforcement procedure may include, for instance, the filtering out of at least a portion of the data that matches a target pattern if a pattern match is detected between the data and the target pattern.

If, on the other hand, a pattern match is not detected between the data and the multiple target patterns, the pattern matching and policy enforcement engine permits the request from the host to perform the memory access operation with the physical storage. Also, to enable one or more attributes of the pattern matching and policy enforcement engine to be configured, the transient memory storage device may expose one or more interfaces. Additional example embodiments and implementations are described further herein below, including memory storage devices that are not transient and/or that include other types of physical storage besides solid state memory.

FIG. 1 is a block diagram 100 illustrating an example memory storage device 102 that is capable of device-side inline pattern matching and policy enforcement. As illustrated, block diagram 100 includes a host 112 as well as memory storage device 102. Memory storage device 102 includes physical storage 104, a pattern matching and policy enforcement engine 106, multiple target patterns 108, and a device I/O channel 110.

In certain example embodiments, memory storage device 102 is operably coupled to host 112 via device I/O channel 110. Data may flow between host 112 and physical storage 104 responsive to memory access requests 114 from host 112. Memory access requests 114 may be, for example, read or write requests. In operation, pattern matching and policy enforcement engine 106 compares the data that is the subject of the memory access request to target patterns 108 to detect if there are any matches. If a pattern match is detected, pattern matching and policy enforcement engine 106 may invoke policy enforcement by, for instance, terminating a data transfer and/or preventing the requested memory access. Other example actions that may be implemented when a policy enforcement mechanism is invoked are described herein below with particular reference to block 212 of FIG. 2.

Target patterns 108 may include any patterns for which it may be desirable to compare them to data and attempt to detect any matches. One example type of target pattern is a signature. For instance, target patterns 108 may include malware signatures. Malware signatures may be, for example, predetermined coding markers that indicate the likely presence of malware. Malware may include, by way of example but not limitation, viruses, worms, Trojan horses, rootkits, spyware, "dishonest" adware, keystroke loggers, botnets, other potentially-unwanted programs (PUPs), combinations and/or derivatives thereof, and so forth.

Memory storage device 102 may be fixed and/or incorporated into host 112. Alternatively, memory storage device 102 may be transient and removably coupled to host 112. Host 112 may be a server computer, a network storage rack or unit, a network router or switch, an embedded computational machine, a desktop computer, a notebook computer, a console gaming machine, a portable entertainment appliance (e.g., a game or music player), a mobile phone, some combination thereof, and so forth.

Physical storage 104 may be formed from any one or more of many different types of memory. Example memory types include, but are not limited to, tape storage; disk drive storage; magnetic storage; optical storage; flash memory, ferroelectric random access memory (RAM), magnetoresistive RAM, phase change memory (PCM), or other types of solid-state memory storage; and other types of non-volatile memory storage generally. For instance, memory storage device 102 may include both flash memory and disk drive storage as physical storage 104 and may be fixed and incorporated into host 112. Alternatively, memory storage device 102 may include flash memory as physical storage 104 and may be transient and removably coupled to host 112 (e.g., memory storage device 102 may be a USB memory card, stick, module, etc.). Other combinations and derivations may also be implemented.

Thus, in an example embodiment, memory storage device 102 is capable of inline pattern matching and policy enforcement. Memory storage device 102 includes physical storage 104 that is capable of storing data, I/O channel 110, and pattern matching and policy enforcement engine 106. I/O channel 110 receives a request 114 from host 112 to perform a memory access operation with physical storage 104. Pattern matching and policy enforcement engine 106 is positioned so as to intercept data flowing between I/O channel 110 and physical storage 104.

Pattern matching and policy enforcement engine 106 performs a pattern matching procedure on the data with reference to multiple target patterns 108 in real-time while the data is being intercepted. It invokes a policy enforcement mechanism if a pattern match is detected between the data and the target pattern. On the other hand, pattern matching and policy enforcement engine 106 permits the request from host 112 to perform the memory access operation with physical storage 104 if a pattern match is not detected between the data and target patterns 108.

Figure 2:
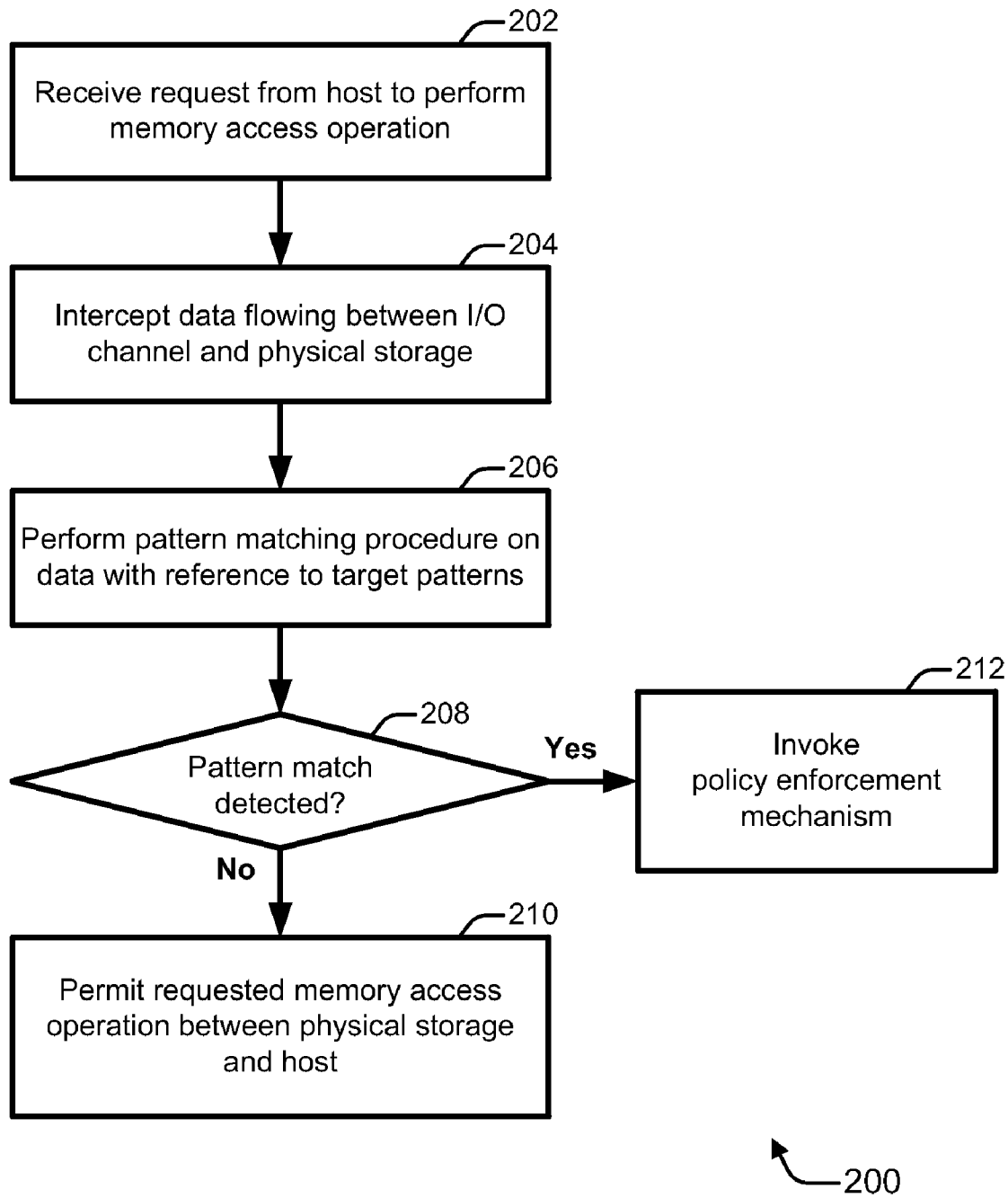
FIG. 2 is a flow diagram that illustrates an example of a method for device-side inline pattern matching and policy enforcement.

FIG. 2 is a flow diagram 200 that illustrates an example of a method for device-side inline pattern matching and policy enforcement. Flow diagram 200 includes six blocks 202-212. Implementations of flow diagram 200 may be realized, for example, as hardware plus firmware and/or as part of memory storage device 102 (e.g., of FIG. 1), including at least partially by a pattern matching and policy enforcement engine 106. Example embodiments for implementing flow diagram 200 are described below in conjunction with the description of FIG. 1.

The acts of the flow diagrams (200, 800, and 900) that are described herein may be performed in many different environments and with a variety of different devices, such as by a memory storage device 102 (e.g., of FIGS. 1 and 3-6). The orders in which the methods are described are not intended to be construed as a limitation, and any number of the described blocks can be combined, augmented, rearranged, and/or omitted to implement a respective method, or an alternative method that is equivalent thereto. Although specific elements of certain other FIGS. are referenced in the description of these flow diagrams, the methods may be performed with alternative elements.

For example embodiments, at block 202, a request is received from a host to perform a memory access operation. For example, a memory access request 114 to perform a memory access operation may be received from a host 112 via a device I/O channel 110 of a memory storage device 102.

At block 204, data flowing between an I/O channel and physical storage is intercepted. For example, data flowing between I/O channel 110 and physical storage 104 may be intercepted by a pattern matching and policy enforcement engine 106. At block 206, a pattern matching procedure is performed on data with reference to target patterns. For example, a pattern matching procedure may be performed by pattern matching and policy enforcement engine 106 with reference to multiple target patterns 108.

At block 208, it is determined if a pattern match is detected. For example, it may be determined whether or not a target pattern of target patterns 108 matches at least a portion of the data flowing between I/O channel 110 and physical storage 104. If not, then at block 210 the requested memory access operation is permitted between the physical storage and the host. For example, data may be permitted to be read from or written to physical storage 104 as requested by host 112 with memory access request 114.

If, on the other hand, a pattern match is detected (at block 208), then at block 212 a policy enforcement mechanism is invoked. A policy enforcement mechanism or procedure may involve one or more of many potential actions. These actions may include, by way of example but not limitation, filtering of at least a portion of the data to which a memory access request is directed, rejecting a memory access request, refusing to initiate a memory access operation, terminating a memory access operation that has been initiated, redirecting at least a portion of a memory access request to a quarantined area, logging the detection event, combinations thereof, and so forth. Which policy or policies are implemented when the policy enforcement mechanism is invoked may be configurable by the manufacturer and/or user of the memory storage device.

For example, at least the portion of the data that matches a target pattern may be filtered out. More specifically, the portion of the data that matches a target pattern of target patterns 108 may be prevented by pattern matching and policy enforcement engine 106 from being read from or stored at physical storage 104 by host 112. Once a pattern match has been detected, data flow between physical storage 104 and I/O channel 110 (and thus physical storage 104 and host 112) may be terminated or otherwise prevented in accordance with an example policy enforcement mechanism.

Figure 3:
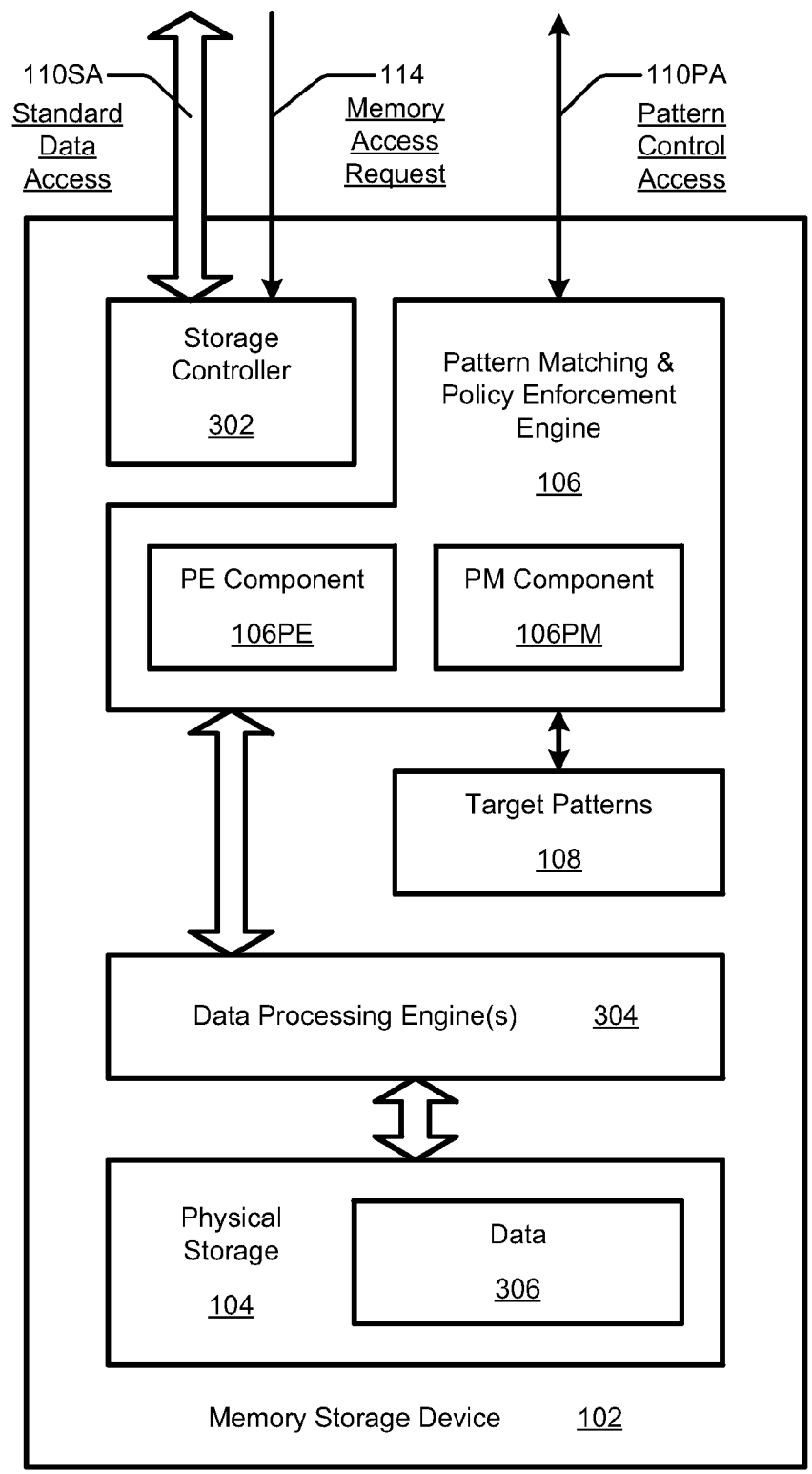
FIG. 3 is a block diagram illustrating an example memory storage device from a component perspective.

FIG. 3 is a block diagram 300 illustrating an example memory storage device 102 from a component perspective. An example general implementation of a memory storage device 102 is described herein above with particular reference to FIG. 1. However, a memory storage device 102 may include other components in any of many possible layouts and arrangements. Such an example alternative implementation is shown in FIG. 3.

As illustrated in FIG. 3, memory storage device 102 includes physical storage 104, pattern matching and policy enforcement engine 106, multiple target patterns 108, and an I/O channel. However, the I/O channel 110 (of FIG. 1) is separated into a standard data access channel 110SA and a pattern control access channel 110PA. Pattern matching and policy enforcement engine 106 includes a pattern matching component 106PM and a policy enforcement component 106PE. Memory storage device 102 also includes at least one storage controller 302, one or more data processing engines 304, and data 306. Physical storage 104 includes data 306 that is requested to be read or that is successfully written.

In an example embodiment, I/O channel 110 is separated into standard data access channel 110SA and pattern control access channel 110PA. Data being sent to or retrieved from physical storage 104 propagates over standard data access channel 110SA. Control, configuration, and other pattern-matching-and-policy-enforcement related information is transported over pattern control access channel 110PA. Examples of control, configuration, and other pattern-related information are described herein below. Standard data access channel 110SA and pattern control access channel 110PA may be physically and/or logically separate portions of I/O channel 110.

Storage controller 302 accepts a request 114 to perform a memory access operation with physical storage 104 from the I/O channel (e.g., from standard data access channel 110SA). Thus, storage controller 302 may control memory access operations with physical storage 104 of memory storage device 102. As shown, storage controller 302 is positioned between the I/O channel and pattern matching and policy enforcement engine 106, and pattern matching and policy enforcement engine 106 is positioned between storage controller 302 and physical storage 104.

In operation, pattern matching component 106PM performs pattern matching procedures as part of pattern matching and policy enforcement engine 106. An example real-time pattern matching procedure is described herein below with particular reference to FIG. 5. Policy enforcement component 106PE performs a policy enforcement procedure as part of pattern matching and policy enforcement engine 106. Hence, policy enforcement component 106PE invokes a policy enforcement mechanism when a pattern match is detected by pattern matching component 106PM. For example, policy enforcement component 106PE may filter out data that is detected by pattern matching component 106PM to match a target pattern of target patterns 108. At least pattern matching component 106PM has access to target patterns 108.

One or more data processing engines 304 may also be included as part of memory storage device 102. Data processing engines 304 represent engines that are capable of performing other data processing tasks. Examples of other data processing tasks include, but are not limited to, encryption and/or decryption, error checking and/or correction, authentication when access is privileged or limited, combinations thereof, and so forth.

The layout and arrangement illustrated in block diagram 300 is an example implementation, but other implementations may alternatively be realized. For example, the orders and relative proximities of the different components may be altered. For instance, pattern matching and policy enforcement engine 106 may be directly coupled to I/O channel 110 (including standard data access channel 110SA) with storage controller 302 being positioned "closer" to physical storage 104. On the other hand, pattern matching and policy enforcement engine 106 may be directly coupled to physical storage 104.

Other layouts and arrangements may alternatively be implemented while keeping pattern matching and policy enforcement engine 106 architecturally inline with data access operations. Pattern matching and policy enforcement engine 106 may be inline when it is positioned along the access path for physical storage 104. In other words, pattern matching and policy enforcement may be performed inline when an entity responsible for propagating data 306 between physical storage 104 and I/O channel 110 is capable of performing the pattern matching and policy enforcement operations.

Figure 4:
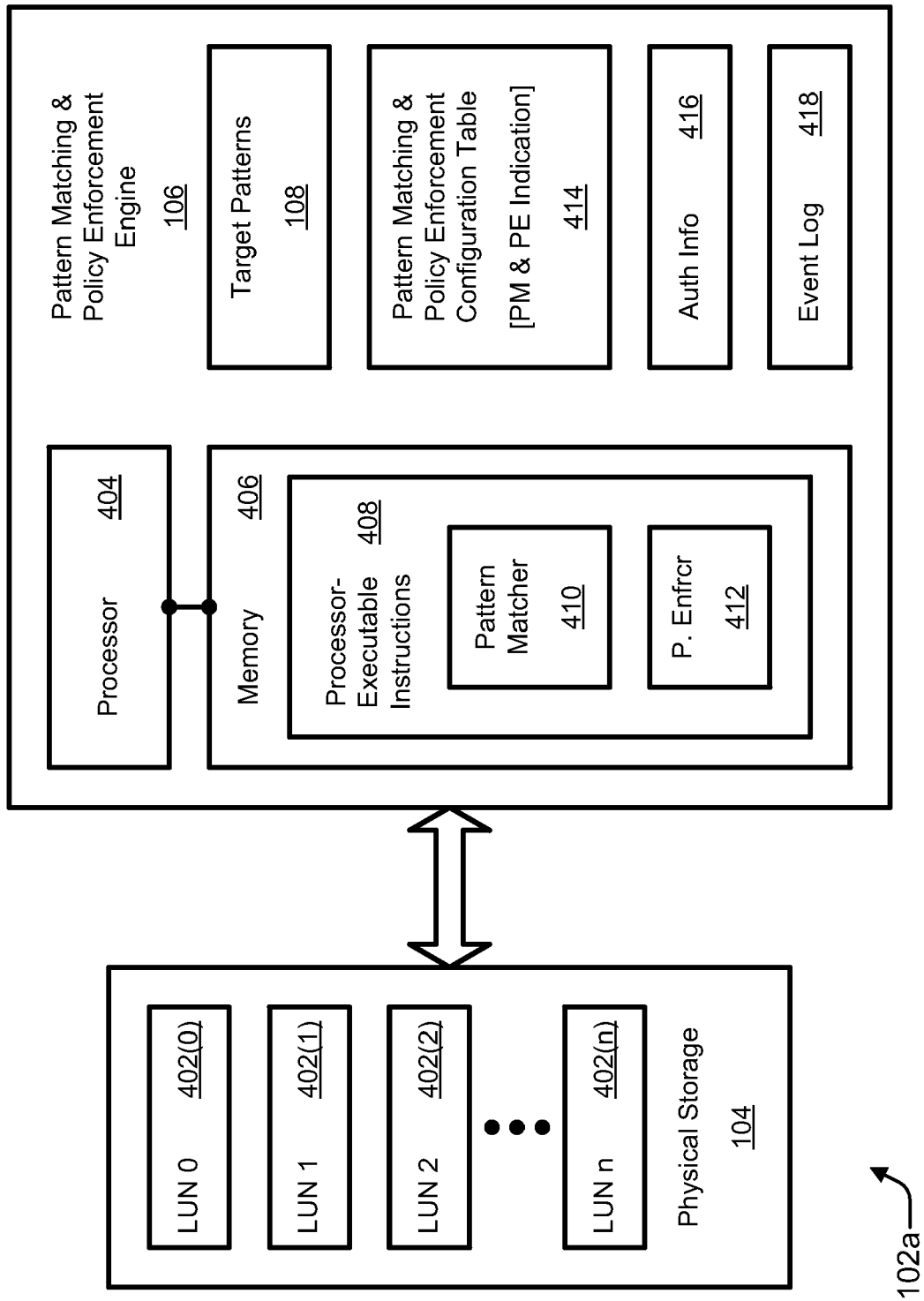
FIG. 4 illustrates an example memory storage device having physical storage from a functional perspective.

FIG. 4 illustrates an example memory storage device 102a having physical storage 104 from a functional perspective. As noted above, an example general implementation of a memory storage device 102 is described herein above with particular reference to FIG. 1. However, a memory storage device 102 may include other functionality in any of many possible combinations. Such an example alternative functional implementation is shown in FIG. 4.

As illustrated in FIG. 4, memory storage device 102a includes physical storage 104 and pattern matching and policy enforcement engine 106. Physical storage 104 may include one or more logical unit numbers (LUNs) 402. As shown, physical storage 104 includes "n" LUNs: LUN 0 402(0), LUN 1 402(1), LUN 2 402(2) . . . LUN n 402(n), with "n" representing some positive integer. When multiple LUNs 402 are present or defined in physical storage 104, each LUN 402 may be independently configured for different access rights, capabilities, etc., including having different pattern matching and policy enforcement attributes.

In an example embodiment, pattern matching and policy enforcement engine 106 includes at least one processor 404 and one or more memories 406. Memory 406 may include processor-executable instructions 408. Processor executable instructions 408 may include a pattern matcher 410 and a policy enforcer 412. Pattern matcher 410 performs pattern matching procedures, and policy enforcer 412 performs policy enforcement procedures as described herein and illustrated in the various block, flow, and other diagrams.

Device-side inline pattern matching and policy enforcement may be implemented using a hardware-based approach in which pattern matching and policy enforcement engine 106 is realized using hardware, firmware, or a combination of hardware and firmware. The hardware and/or firmware may be realized using processor 404 in conjunction with processor-executable instructions 408 of processor-accessible memory 406.

Processor 404 may be implemented using any applicable processing-capable technology, and one may be realized as a general-purpose or a special-purpose processor. Examples include, but are not limited to, a microprocessor, a controller, a derivative or combination thereof, and so forth. Generally, processor 404 is capable of executing, performing, and/or otherwise effectuating processor-executable instructions, such as processor-executable instructions 408. Processor-executable instructions 408 may be embodied as firmware, hardware, fixed logic circuitry, some combination thereof, and so forth. When embodied as firmware, processor-executable instructions 408 (and target patterns 108) may be changed (e.g., updated) from time to time, such as by using the interfaces described herein below with particular reference to FIG. 7. If target patterns 108 are not realized as firmware, then they can be updated or otherwise modified using a different technique.

In other words, memory 406 may include processor-executable instructions 408 that are executable by processor 404 to effectuate the performance of functions by memory storage device 102a. It should be understood that processor 404 and processor-executable instructions 408 of memory 406 may be fully or partially combined into hard-coded logic. However, if at least part of processor-executable instructions 408 are implemented as firmware, they may more easily be updated over time.

As illustrated for memory storage device 102a, pattern matching and policy enforcement engine 106 also includes a pattern matching and policy enforcement configuration table 414, authentication information 416, and at least one event log 418. It should be noted that these table, information, and log elements, as well as memory 406, may be separate storage elements or may be part of physical storage 104. It should also be noted that processor 404 and/or memory 406 may be shared with other data processing engines (e.g., data processing engines 304 (of FIG. 3)). Although not explicitly illustrated, pattern matching and policy enforcement engine 106 or physical storage 104, or another part of memory storage device 102a, may include a quarantined area to store data that matches a target pattern.

In an example embodiment, pattern matching and policy enforcement configuration table 414 includes one or more pattern matching and policy enforcement indications representing attributes of pattern matching and policy enforcement engine 106. In other words, whether or not pattern matching and policy enforcement is enabled may be selectable and may be indicated by pattern matching and policy enforcement configuration table 414. More specifically, a pattern matching and policy enforcement indication may connote if pattern matching and policy enforcement is enabled for physical storage 104 of memory storage device 102a. This may be a singular indication for the entirety of physical storage 104.

Alternatively, the configuration table may provide a finer granularity by having a pattern matching and policy enforcement indication for each LUN 402 of physical storage 104. Thus, each LUN 402 may be independently configured as to whether to not pattern matching and policy enforcement is enabled. The number of enablement indications in pattern matching and policy enforcement configuration table 414 for such an implementation may thus equal the number of LUNs 402. Additionally, the configuration table may provide a finer granularity by having a pattern matching and policy enforcement indication for each of ingress (e.g., write) operations and egress (e.g., read) operations. Thus, pattern matching and policy enforcement may be enabled for ingress operations but not for egress operations, or vice versa. The number of enablement indications in pattern matching and policy enforcement configuration table 414 for such an implementation may thus be two—one each for ingress and egress policy enforcement.

The LUN and operation type policy granularities may also be combined so that pattern matching and policy enforcement configuration table 414 connotes whether pattern matching and policy enforcement is enabled by LUN and operation type. The number of enablement indications in pattern matching and policy enforcement configuration table 414 in such an implementation may thus be proportional to the number of LUNs 402 multiplied by two or three, depending on how operation types are indicated.

An example pattern matching and policy enforcement configuration table 414 below (Table 1) shows how pattern matching and policy enforcement enablement indications may be segmented by LUN and operation type. In Table 1, three LUNs 402 are listed: LUN #0, LUN #1, and LUN #2. There is a separate indication per LUN (i.e., the column entitled "PM & PE Enabled") as to whether pattern matching and policy enforcement is enabled overall for the corresponding LUN. If it is enabled for a LUN, it may be further segmented by ingress or egress operation type in the following two columns. Alternatively, the "PM & PE Enabled" column may be omitted.

TABLE 1

Example Pattern Matching and Policy Enforcement
Configuration Table

| LUN # | PM & PE Enabled | Ingress Enabled | Egress Enabled |
|---|---|---|---|
| 0 | Yes | Yes | Yes |
| 1 | No | N/A | N/A |
| 2 | Yes | No | Yes |

In an example embodiment, authentication information 416 is stored on memory storage device 102a (e.g., associated with or as part of pattern matching and policy enforcement engine 106). Authentication information 416 pertains to information that is used to authenticate and thus permit the manipulation of pattern matching and policy enforcement attributes. Example authentication and attribute manipulations (e.g., configuration setting and/or modifying) are described further herein below with particular reference to FIG. 7. Examples of authentication information 416 include, but are not limited to, a password, a symmetric key, an asymmetric key, a combination thereof, and so forth.

In an example embodiment, event log 418 includes events relating to pattern matching and policy enforcement that have been logged to memorialize them. For example, when a match is detected between data and a target pattern, the match may be logged. For instance, all or a portion of the data, the matched target pattern, date and time information, a requesting host, a combination thereof, etc. may be logged. Thus, as part of a policy enforcement mechanism, an event involving a data access termination, rejection, filtering, etc. may be logged. Furthermore, a pattern matching detection event may be logged even when no direct action is taken that impacts the memory access operation. Such an example implementation enables a test mode to determine what data transfers might be affected if policy enforcement beyond logging were activated. In fact, memory access requests that do not precipitate a detected pattern match may also be logged to reflect that a successful operation was performed without a pattern match detection. Example logging opportunities are described herein below with particular reference to FIGS. 8 and 9.

Figure 5:
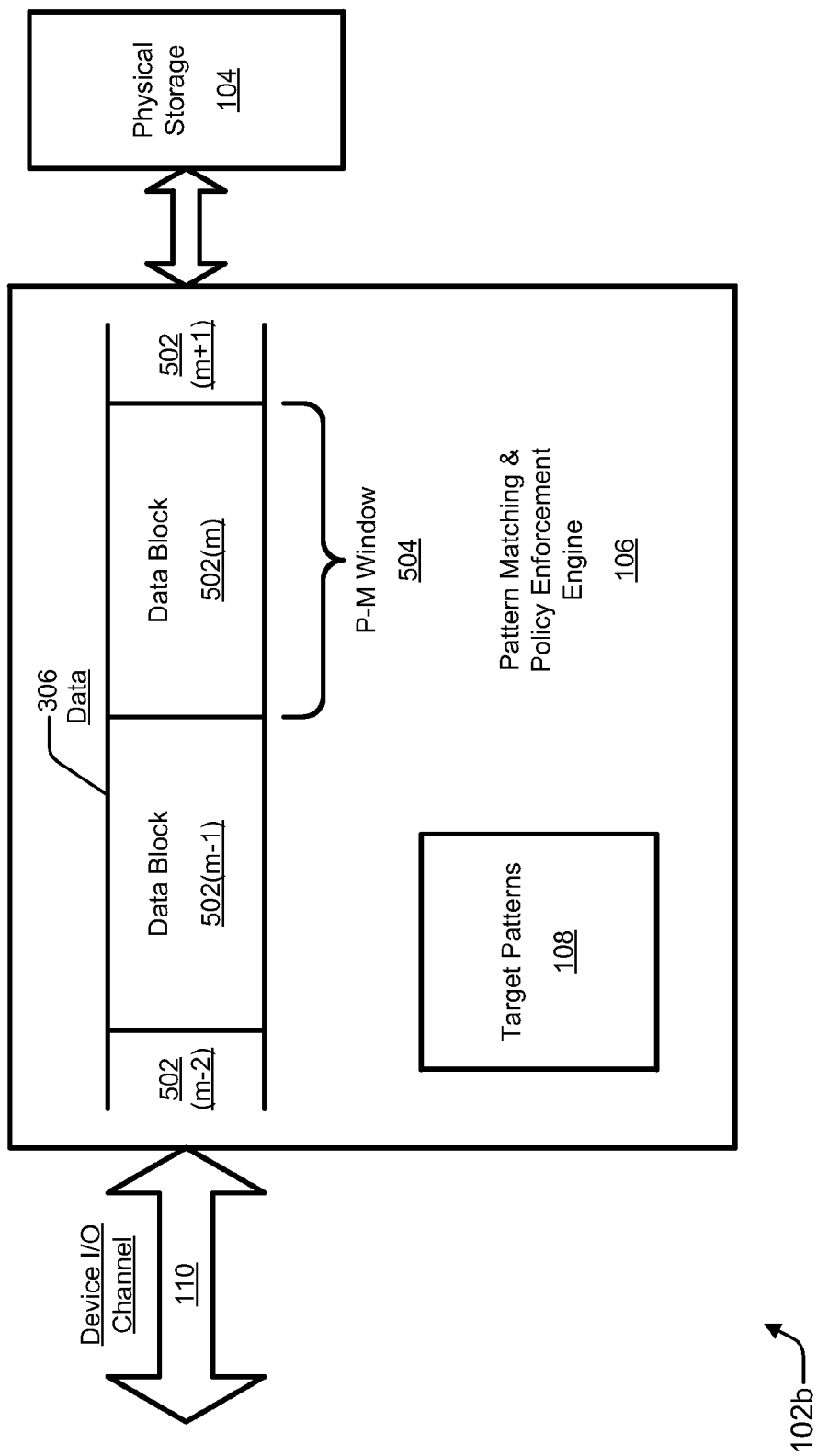
FIG. 5 illustrates an example approach to real-time pattern matching and policy enforcement using a pattern-matching window.

FIG. 5 illustrates an example approach to real-time pattern matching and policy enforcement using a pattern-matching window 504. As illustrated, a memory storage device, denoted generally by 102b, includes a device I/O channel 110, a pattern matching and policy enforcement engine 106, and physical storage 104. Pattern matching and policy enforcement engine 106 includes data 306 that is segmented into data blocks 502. Specifically, data blocks . . . 502($m-2$), 502($m-1$), 502($m$), 502($m+1$) . . . are shown as being propagated through pattern matching and policy enforcement engine 106.

In example embodiments, data 306 is being streamed between I/O channel 110 and physical storage 104. During the streaming, pattern matching and policy enforcement engine 106 is intercepting data 306. A length of pattern-matching window 504 is substantially equal to a length of data blocks 502. With real-time pattern matching as shown in FIG. 5, data 306 is analyzed in chunks of data in accordance with a length of pattern-matching window 504. The length of pattern-matching window 504 is variable. Thus, device-side, variable-length inline real-time pattern matching and policy enforcement may be implemented. When data 306 is analyzed in chunks of data blocks 502, the acts of blocks 206-212 (of flow diagram 200 of FIG. 2) may be repeated for each data block 502.

Fragmentation across offsets and overwhelmed buffering may occur during pattern matching and policy enforcement operations. This is a possibility because the resources available on any single device are ultimately finite. This is especially true when real-time pattern matching operations are being performed with a pattern-matching window 504. This possibility may be accommodated, at least to some extent, by strictly invoking the policy enforcement. In other words, policy enforcement may be invoked whenever there is any error, even if there is no actual pattern match detected between the data of the memory access operation and the target patterns. For example, a write memory access operation may be rejected if there is a buffer overrun error, even without a pattern match detection.

Figure 6:
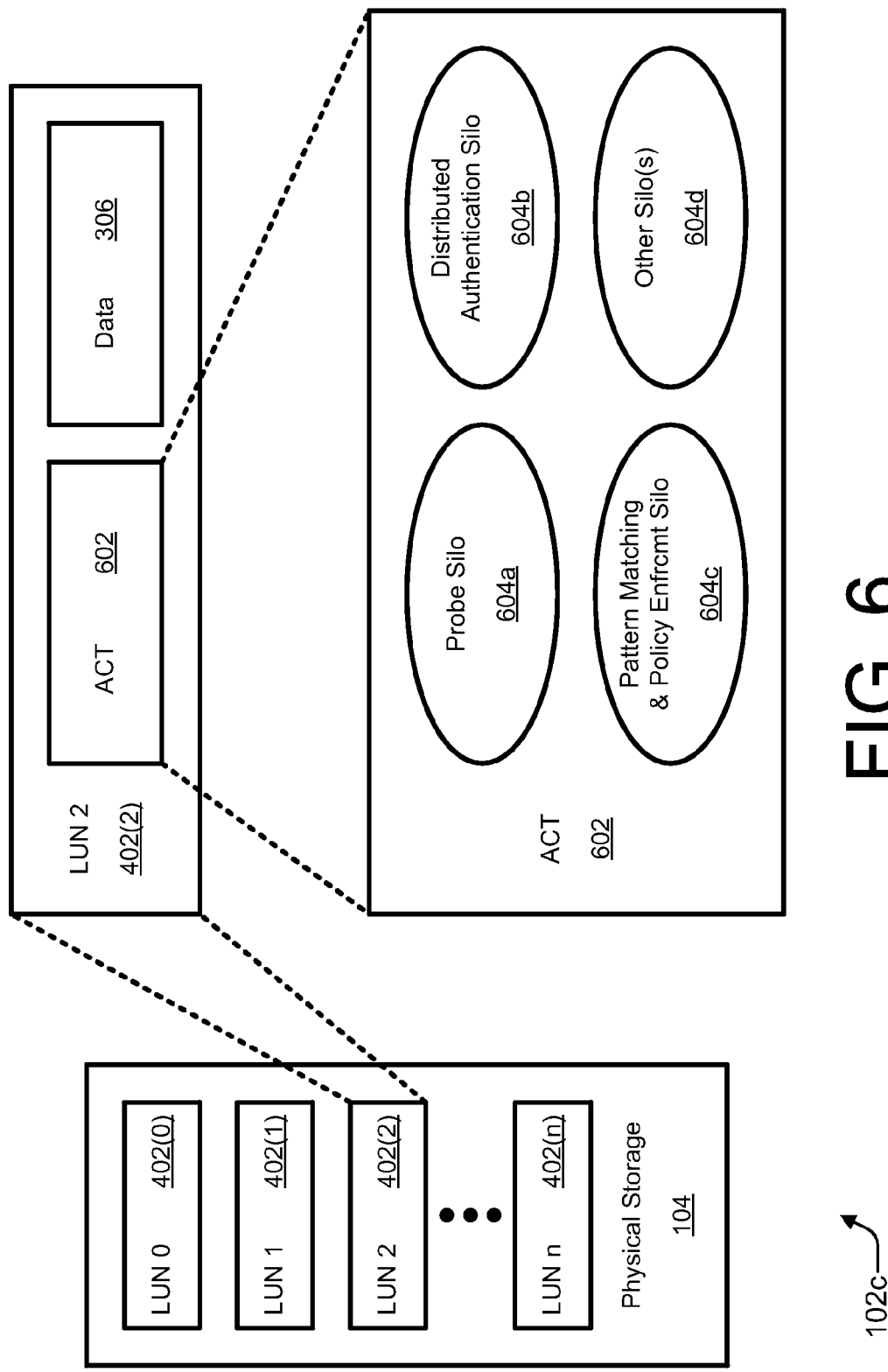
FIG. 6 illustrates an example organization for physical storage using logical unit numbers (LUNs) and addressable command targets (ACTs) with one or more silos.

FIG. 6 illustrates an example organization for physical storage 104 using LUNs 402 and addressable command targets (ACTs) 602 with one or more silos 604. As illustrated, a memory storage device, denoted generally by 102c, includes physical storage 104. LUN 2 402(2) includes an ACT 602 and data 306. ACT 602 includes a probe silo 604a, a distributed authentication silo 604b, a pattern matching and policy enforcement silo 604c, and one or more other silos 604d. Although ACT 602 mechanism is shown with respect to LUN 2 402(2), an ACT may be implemented in any one or more of LUNs 402. Also, although four example silos 604 are shown, more or fewer silos 604 may alternatively be implemented.

In an example embodiment, at least one LUN 402 is organized based on an ACT paradigm. With an ACT paradigm, access to data 306 may be effected in accordance with at least one silo 604. Each ACT 602 may thus contain one or more silos 604. An example of an ACT paradigm having silos is promulgated by the Institute of Electrical & Electronics Engineers (IEEE) 1667 standards (e.g., "Standard Protocol for Authentication in Host Attachments of Transient Storage Devices"). In a current IEEE 1667 standard, a probe silo and a distributed authentication silo are described. Beyond these two silo types, proprietary silos are envisioned. In certain example implementations, a memory storage device 102 may include a pattern matching and policy enforcement silo 604c that comports with an IEEE 1667 standard to enable pattern matching and policy enforcement configuration actions via a standardized transport mechanism.

Probe silo 604a functions as a directory or information content source that identifies and potentially describes other available silos. Distributed authentication silo 604d relates to authentication procedures for ACT 602. Pattern matching and policy enforcement silo 604c enables access to configurable and readable pattern matching and policy enforcement attributes. Example attributes and an example interface for pattern matching and policy enforcement silo 604c are described herein below with particular reference to FIG. 7.

In operation, a host that is making a memory access request may identify the LUN and then the address of the data. If an ACT 602 access is being attempted, the access request may identify the LUN and/or the ACT address and then the address of the desired silo 604. It should be understood that other ACT paradigms and silo organizations (in addition to those that are described herein and/or by IEEE 1667) may alternatively be implemented.

Figure 7:
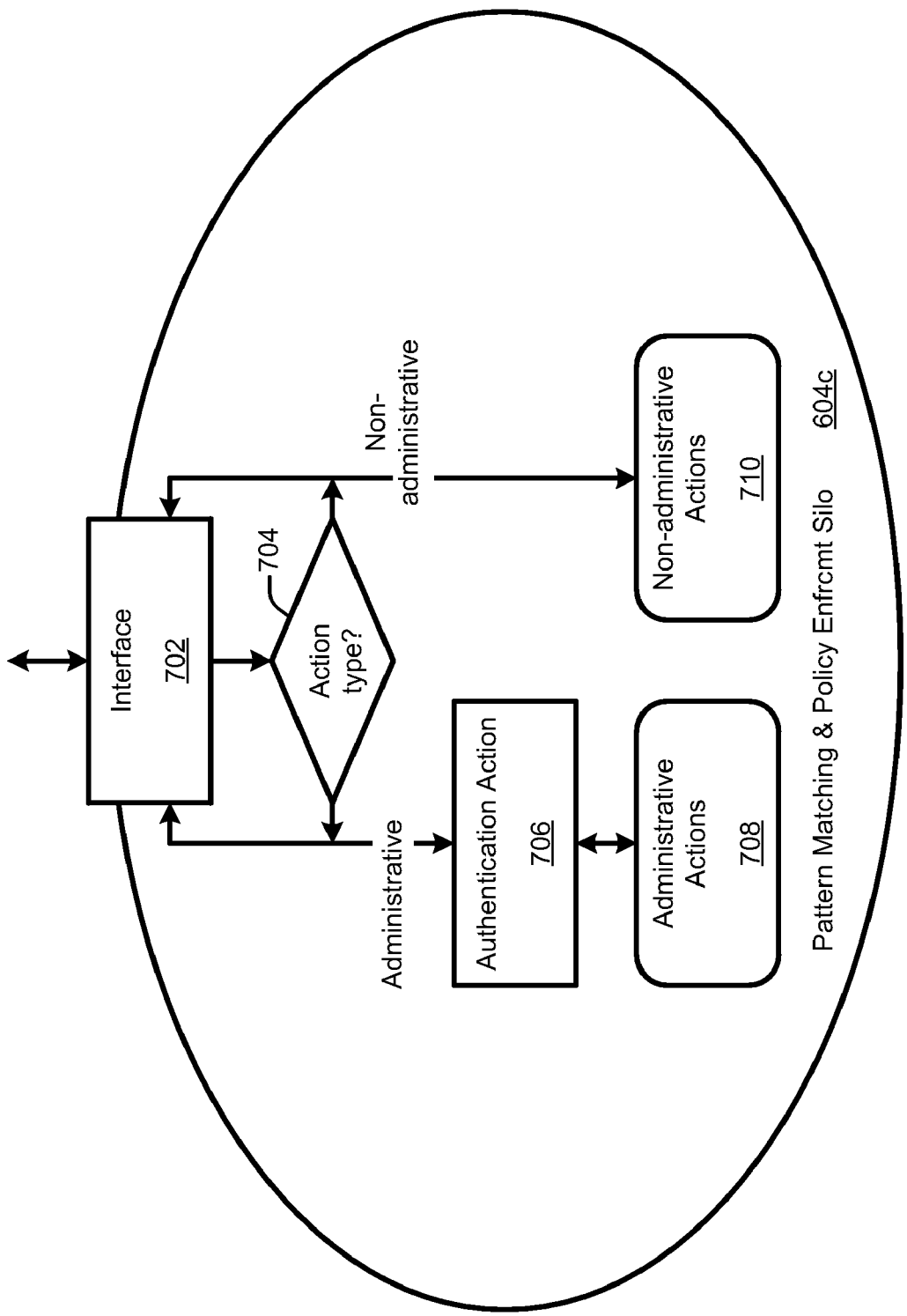
FIG. 7 illustrates example functionality for a pattern matching and policy enforcement silo.

FIG. 7 illustrates example functionality for a pattern matching and policy enforcement silo 604c. As shown, pattern matching and policy enforcement silo 604c includes an interface 702, an authentication action 706, administrative actions 708, and non-administrative actions 710. In example embodiments, interface 702 is exposed by pattern matching and policy enforcement silo 604c of a memory storage device 102. As described further below, interface 702 provides access to actions that enable pattern matching and policy enforcement configuration attributes to be set or inspected.

Interface 702 may be accessed via device I/O channel 110 (e.g., pattern control access channel 110PA). When an action is requested, it is determined at block 704 whether the action is an administrative level action or a non-administrative level action. Non-administrative actions 710 may be performed without authentication. Administrative actions 708, on the other hand, are performed after authentication action 706 (once the memory storage device has been initially provisioned).

Pattern matching and policy enforcement silo 604c may expose interfaces 702 to perform the following administrative actions 708: (a) Provision the administrative entity (e.g., using a password, symmetric key, asymmetric key, etc.). (b) Authenticate as the administrative entity (using, e.g., a password, symmetric key, asymmetric key, etc.). (c) Configure the enforcement of the pattern matching and policy enforcement (e.g., set attributes by LUN, ingress policy enforcement, egress policy enforcement, etc.). (d) Update the target patterns, which may be stored as firmware and/or in modifiable non-volatile memory, on the memory storage device. (e) Clear event logs (e.g., event logs 418). Additionally, setting a policy enforcement procedure configuration (e.g., setting which action(s) are taken when a policy enforcement mechanism is invoked) may be performed as an administrative action 708.

As described above as an example administrative action 708 under (d), the target patterns may be updated as an administrative action that is performable after an authentication action 706. However, the device may be configured such that an additional validation of the updated target patterns is performed before they are installed. In other words, the operational firmware (e.g., of pattern matching and policy enforcement engine 106) may cause additional signature validation of the updated target patterns to be performed independently from the administrative authentication. For example, a manufacturer may require an administrative entity to authenticate to the device to make changes to the target patterns. After authentication as the administrative entity, the manufacturer may additionally elect to constrain the updating of target patterns to those target pattern payloads that are also signed by the manufacturer.

Pattern matching and policy enforcement silo 604c may expose interfaces 702 to perform the following non-administrative actions 710: (a) Retrieve the event logs. (b) Retrieve the version of the pattern matching and policy enforcement silo implementation. (c) Retrieve the configuration attributes of the pattern matching and policy enforcement silo (e.g., the enablement indications of pattern matching and policy enforcement configuration table 414). It should be understood that an interface may be exposed that enables performance of both administrative and non-administrative actions in manners that do not adhere to a silo or an ACT-based implementation.

When these interfaces 702 are in effect with a pattern matching and policy enforcement silo 604c, access to target patterns 108 may be limited to those having administrative privileges with pattern matching and policy enforcement silo 604c as evidenced by authentication action 706. If pattern matching and policy enforcement silo 604c has not been initially provisioned, then any entity may initially provision the memory storage device. Initial provisioning may entail establishing a password, a symmetric key, an asymmetric key, etc for authentication purposes via authentication action 706. After pattern matching and policy enforcement silo 604c is provisioned, the provisioned credential is to be used prior to permitting the performance of any administrative actions, as described above.

Figure 8:
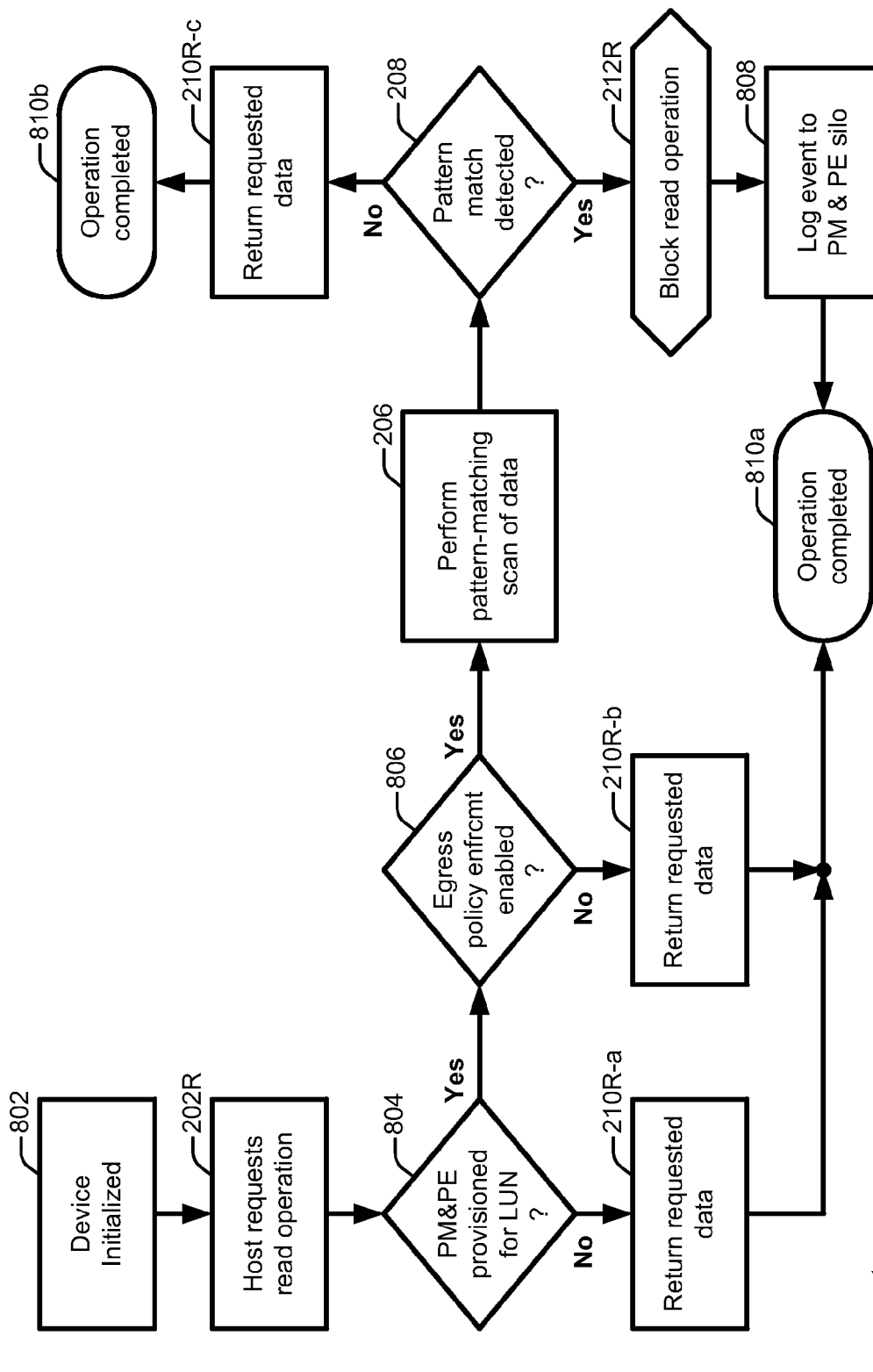
FIG. 8 is a flow diagram that illustrates an example of a method for device-side inline pattern matching and policy enforcement for a read operation.
Figure 9:
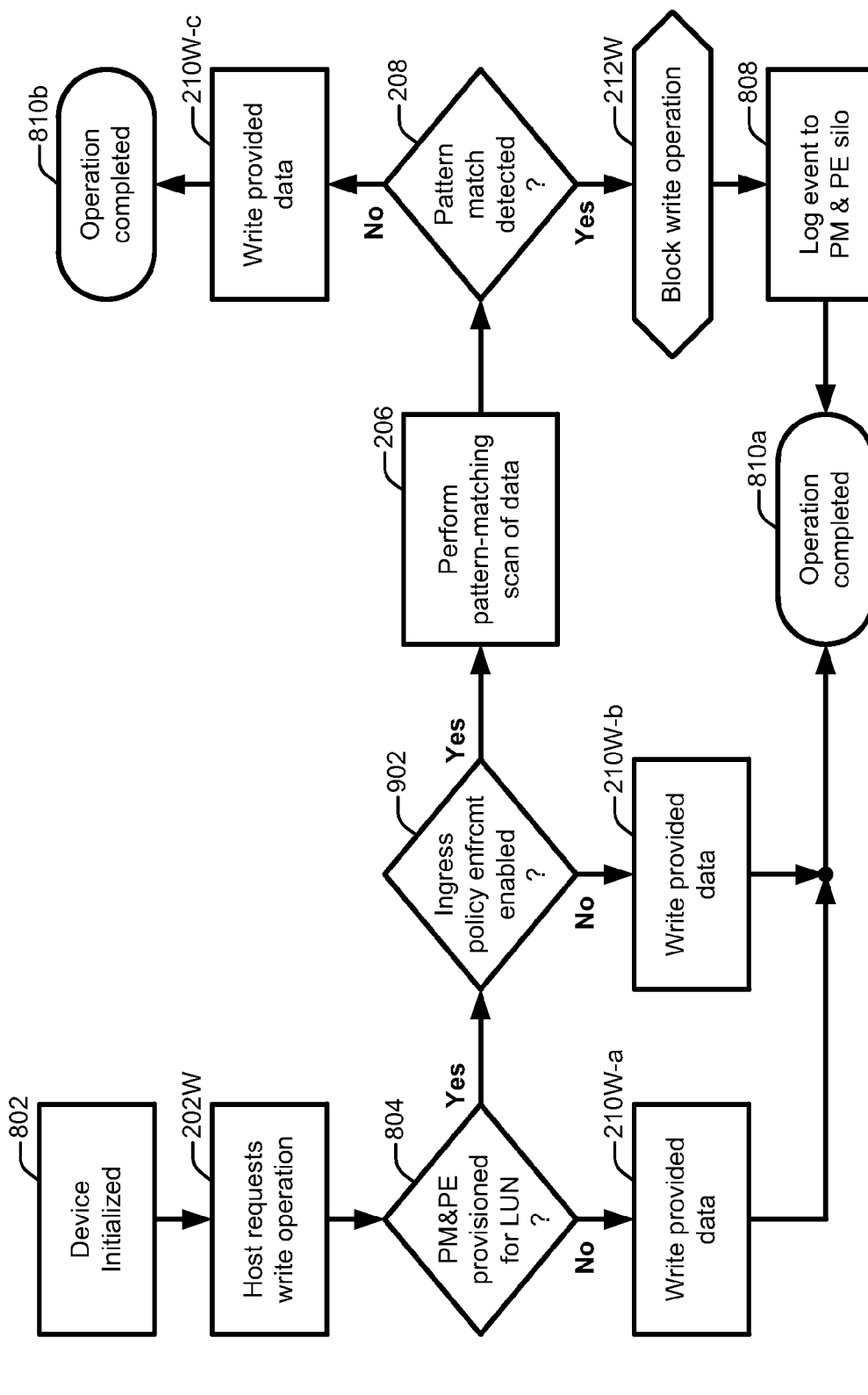
FIG. 9 is a flow diagram that illustrates an example of a method for device-side inline pattern matching and policy enforcement for a write operation.

FIG. 8 is a flow diagram 800 that illustrates an example of a method for device-side inline pattern matching and policy enforcement for a read operation. FIG. 9 is a flow diagram 900 that illustrates an example of a method for device-side inline pattern matching and policy enforcement for a write operation. Implementations of flow diagrams 800 and 900 may be realized, for example, as hardware plus firmware and/or as part of a memory storage device 102 (e.g., of FIGS. 1 and 3-6), including at least partially by a pattern matching and policy enforcement engine 106. Flow diagrams 800 and 900 relate to implementations in which pattern matching and policy enforcement configuration attributes are segmented by both LUN and operation type (e.g., ingress or egress operations) and to those including silos. They are also directed to implementations in which the policy enforcement mechanism upon a pattern match detection includes at least the blocking of the memory access operation and logging of the event.

In flow diagram 800, at block 802, the memory storage device is initialized so that memory access requests may be made by a host. At block 202R, a request is received from the host for a read operation from the memory storage device for an identified LUN. At block 804, it is determined if the identified LUN is provisioned for pattern matching and policy enforcement (e.g., by inspecting a pattern matching and policy enforcement configuration table 414). If not, then the requested data is returned to the host at block 210R-a.

If the identified LUN is provisioned for pattern matching and policy enforcement, it is determined at block 806 if egress policy enforcement is enabled. If not, then the requested data is returned to the host at block 210R-b. If egress policy enforcement is enabled, then at block 206 a pattern matching procedure is performed on the requested data to scan the data with reference to multiple target patterns. At block 208, it is determined if a pattern match is detected. If not, then the requested data is returned to the host at block 210R-c. After the requested data is returned to the host at block 210R-a, 210R-b, or 210R-c, the read operation may be considered to be completed at block 810a or 810b.

If, on the other hand, it is determined that there is a pattern match to at least a portion of the scanned data (e.g., a malware infection is detected at block 208), then at block 212R the read operation is blocked as a result of invoking a policy enforcement mechanism. The read operation may be blocked, for example, by refusing to initiate the read operation or by terminating the read operation during a transfer. Alternatively, another policy enforcement action may be taken, such as filtering the matching data. At block 808, the blocked read operation event is logged to an event log (e.g., event log 418) that is associated with the pattern matching and policy enforcement silo of the identified LUN. After the event is logged, the (at least partially failed) read operation may be considered to be completed at block 810a.

In flow diagram 900, at block 802, the memory storage device is initialized so that memory access requests may be made by a host. At block 202W, a request is received from the host for a write operation to the memory storage device for an identified LUN. At block 804, it is determined if the identified LUN is provisioned for pattern matching and policy enforcement (e.g., by inspecting a pattern matching and policy enforcement configuration table 414). If not, then the provided data is written to the physical storage of the memory storage device at block 210W-a.

If the identified LUN is provisioned for pattern matching and policy enforcement, it is determined at block 902 if ingress policy enforcement is enabled. If not, then the provided data is written to the physical storage of the memory storage device at block 210W-b. If ingress policy enforcement is enabled, then at block 206 a pattern matching procedure is performed on the provided data to scan the data with reference to multiple target patterns. At block 208, it is determined if a pattern match is detected. If not, then the provided data is written to the physical storage of the memory storage device at block 210W-c. After the provided data is written to the physical storage of the memory device at block 210W-a, 210W-b, or 210W-c, the write operation may be considered to be completed at block 810a or 810b.

If, on the other hand, it is determined that there is a pattern match to at least a portion of the scanned data (e.g., a malware infection is detected at block 208), then at block 212W the write operation is blocked as a result of invoking a policy enforcement mechanism. The write operation may be blocked, for example, by refusing to initiate the write operation or by terminating the write operation during a transfer. Alternatively, another policy enforcement action may be taken, such as filtering the matching data. At block 808, the blocked write operation event is logged to an event log (e.g., event log 418) that is associated with the pattern matching and policy enforcement silo of the identified LUN. After the event is logged, the (at least partially failed) write operation may be considered to be completed at block 810a.

The devices, acts, features, functions, methods, modules, data structures, techniques, components, etc. of FIGS. 1-9 are illustrated in diagrams that are divided into multiple blocks and other elements. However, the order, interconnections, interrelationships, layout, etc. in which FIGS. 1-9 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for device-side inline pattern matching and policy enforcement.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. A removable memory storage device that is capable of inline pattern matching and policy enforcement, the removable memory storage device comprising:
    a housing enclosing:
        physical storage including solid-state memory that is capable of storing data;
        multiple target patterns that comprise malware signatures;
        an input/output (I/O) channel to receive a request from a host to perform a memory access operation with the physical storage; and
        a pattern matching and policy enforcement engine that is positioned in the removable memory storage device so as to intercept data flowing between the I/O channel and the physical storage, the pattern matching and policy enforcement engine including:
            a pattern matching component to perform a pattern matching procedure on the data with reference to the multiple target patterns in real-time while the data is being intercepted; and
            a policy enforcement component to perform a policy enforcement procedure if a pattern match is detected between the data and the at least one target pattern;
            wherein the pattern matching and policy enforcement engine is to permit the request from the host to perform the memory access operation with the physical storage if a pattern match is not detected between the data and the multiple target patterns;
            wherein the removable memory storage device exposes at least one interface to enable one or more attributes of the pattern matching and policy enforcement engine to be configured.

2. A device-implemented method for inline pattern matching and policy enforcement, the method comprising acts of:
    receiving at a memory storage device a request from a host to perform a memory access operation, the memory storage device being operatively coupled to the host;
    intercepting data flowing between an input/output (I/O) channel and physical storage of the memory storage device;
    performing a pattern matching procedure on the data with reference to multiple target patterns in real-time while the data is being intercepted, the pattern matching procedure being performed onboard the memory storage device;
    if a pattern match is detected between the data and at least one target pattern, invoking, at the memory storage device, a policy enforcement mechanism; and
    if a pattern match is not detected between the data and the multiple target patterns, permitting, at the memory storage device, the request from the host to perform the memory access operation with the physical storage of the memory storage device.

3. The method as recited in claim 2, wherein the act of performing comprises:
    performing the pattern matching procedure on the data with reference to the multiple target patterns while the data is being streamed between the I/O channel and the physical storage of the memory storage device with a pattern-matching window having a variable length.

4. The method as recited in claim 2, further comprising:
    if a requested action with respect to pattern matching and policy enforcement functionality is of an administrative type, requiring, at the memory storage device, that an authentication action be successfully accomplished before permitting the requested action to be performed.

5. The method as recited in claim 2, further comprising:
    providing one or more interfaces that enable attributes of pattern matching and policy enforcement operations to be configured for at least a portion of the physical storage.

6. The method as recited in claim 5, wherein the act of providing comprising:
    exposing a pattern matching and policy enforcement silo that is part of an addressable command target (ACT) mechanism.

7. The method as recited in claim 2, wherein the request from the host to perform the memory access operation identifies a logical unit number (LUN), the logical unit number being part of the memory storage device; and wherein the method further comprises:

responsive to the act of receiving at the memory storage device the request from the host to perform the memory access operation, determining if pattern matching and policy enforcement is provisioned for the identified LUN;

if pattern matching and policy enforcement is determined to be provisioned for the identified LUN, implementing the act of performing a pattern matching procedure; and if pattern matching and policy enforcement is determined not to be provisioned for the identified LUN, omitting the act of performing a pattern matching procedure.

8. The method as recited in claim 2, wherein the policy enforcement mechanism, when invoked, causes one or more of the following acts to be performed:

filtering out at least a portion of the data that matches the at least one target pattern;

rejecting the request from the host to perform the memory access operation;

refusing to initiate the memory access operation;

terminating the memory access operation after initiation;

redirecting at least a portion of the data to a quarantined area; or logging an event reflecting that the pattern match is detected.

9. A system comprising:

a memory storage device that is capable of inline pattern matching and policy enforcement, the memory storage device including:

physical storage that is capable of storing data;

an input/output (I/O) channel to receive a request from a host to perform a memory access operation with the physical storage; and a pattern matching and policy enforcement engine that is positioned so as to intercept data flowing between the I/O channel and the physical storage; the pattern matching and policy enforcement engine to perform a pattern matching procedure on the data with reference to multiple target patterns in real-time while the data is being intercepted and to perform a policy enforcement procedure if a pattern match is detected between the data and the at least one target pattern; the pattern matching and policy enforcement engine to permit the request from the host to perform the memory access operation with the physical storage if a pattern match is not detected between the data and the multiple target patterns.

10. The system as recited in claim 9, wherein the memory storage device is fixed and incorporated into the host; or wherein the memory storage device is transient and is removably coupled to the host.

11. The system as recited in claim 9, further comprising:

a storage controller to accept the request to perform the memory access operation with the physical storage from the I/O channel, the storage controller to control memory access operations with the physical storage for the memory storage device;

wherein the storage controller is positioned between the I/O channel and the pattern matching and policy enforcement engine, and the pattern matching and policy enforcement engine is positioned between the storage controller and the physical storage.

12. The system as recited in claim 9, wherein the pattern matching and policy enforcement engine comprises hardware and firmware; and wherein the firmware may be updated.

13. The system as recited in claim 9, further comprising:

the target patterns being located on the memory storage device, the target patterns including at least malware signatures;

wherein the policy enforcement procedure is user-configurable.

14. The system as recited in claim 9, wherein the pattern matching and policy enforcement engine is to perform the pattern matching procedure on the data while the data is being streamed using a pattern-matching window.

15. The system as recited in claim 9, wherein the physical storage is organized into one or more logical unit numbers (LUNs); and wherein pattern matching and policy enforcement attributes are separately configurable for each LUN of the one or more LUNs.

16. The system as recited in claim 9, further comprising:

a pattern matching and policy enforcement configuration table that includes enablement indications associated with ingress operations and egress operations.

17. The system as recited in claim 9, further comprising:

a pattern matching and policy enforcement silo that exposes at least one interface that enables one or more actions to be performed on the memory storage device with regard to configuring pattern matching and policy enforcement operations and pattern matching and policy enforcement attributes.

18. The system as recited in claim 17, wherein the pattern matching and policy enforcement silo and the at least one interface comport with an Institute of Electrical & Electronics Engineers (IEEE) 1667 standard.

19. The system as recited in claim 9, wherein the memory storage device exposes at least one interface that enables multiple administrative actions and multiple non-administrative actions to be performed with regard to pattern matching and policy enforcement.

20. The system as recited in claim 19, wherein the multiple administrative actions include authentication as an administrative entity, configuration of enforcement attributes for pattern matching and policy enforcement, updating of the multiple target patterns, and clearing of one or more event logs; and wherein the multiple non-administrative actions include retrieval of the one or more event logs, retrieval of version information, and retrieval of the configured enforcement attributes for pattern matching and policy enforcement.

* * * * *